US010812619B2

(12) United States Patent
Chang et al.

(10) Patent No.: US 10,812,619 B2
(45) Date of Patent: Oct. 20, 2020

(54) SYSTEM AND METHOD FOR BULK USER SERVICE ASSIGNMENT USING CSV (71) Applicant: Ingram Micro Inc., Irvine, CA (US)

(72) Inventors: David Hou Chang, Palo Alto, CA (US); David Wippich, Irvine, CA (US); Swarup Das, Durgapur (IN); Amit Roy, Durgapur (IN); Abhisek Mallick, Durgapur (IN); Debabrata Howlee, Durgapur (IN)

(73) Assignee: Ingram Micro Inc., Plainfield, IN (US)

( * ) Notice: Subject to any disclaimer, the term of this patent is extended or adjusted under 35 U.S.C. 154(b) by 0 days.

(21) Appl. No.: 16/279,745

(22) Filed: Feb. 19, 2019

(65) Prior Publication Data
US 2020/0267233 A1    Aug. 20, 2020

(51) Int. Cl.
*H04L 12/24* (2006.01)
*H04L 29/08* (2006.01)
*G06Q 30/06* (2012.01)
*G06F 40/18* (2020.01)

(52) U.S. Cl.
CPC .............. *H04L 67/32* (2013.01); *G06F 40/18* (2020.01); *G06Q 30/0635* (2013.01); *H04L 41/5054* (2013.01)

(58) Field of Classification Search
CPC ........ G06F 40/18; G06F 12/02; G06F 3/0619; G06F 9/45558; G06F 9/5027; G06Q 30/0635; G06Q 10/06315; H04L 41/5054; H04L 67/32; H04L 12/2856; H04L 41/5003; H04L 41/50; H04L 63/0272; H04L 63/08; H04L 63/10; H04L 65/80
See application file for complete search history.

(56) References Cited

U.S. PATENT DOCUMENTS

| | | | |
|---|---|---|---|
| 2006/0050862 A1* | 3/2006 | Shen | H04L 12/2856 379/219 |
| 2013/0166703 A1* | 6/2013 | Hammer | H04L 41/50 709/220 |
| 2016/0173475 A1* | 6/2016 | Srinivasan | G06Q 10/06315 726/6 |
| 2018/0152448 A1* | 5/2018 | Fitzgerald | H04L 63/0272 |
| 2018/0343164 A1* | 11/2018 | Wylie | G06F 9/45558 |
| 2018/0367467 A1* | 12/2018 | Shear | H04L 63/10 |
| 2019/0007521 A1* | 1/2019 | Lipstone | H04L 65/80 |
| 2019/0042353 A1* | 2/2019 | Ahad | H04L 41/5003 |
| 2019/0044979 A1* | 2/2019 | Roth | H04L 63/08 |
| 2019/0079857 A1* | 3/2019 | Sivasubramanian | G06F 12/02 |
| 2019/0102206 A1* | 4/2019 | Fichtenholtz | G06F 9/5027 |
| 2019/0121544 A1* | 4/2019 | Elisha | G06F 3/0619 |

* cited by examiner

*Primary Examiner* — Le H Luu
(74) *Attorney, Agent, or Firm* — Ice Miller LLP (57) ABSTRACT

The present relates to a method for managing user service assignments in a cloud service environment, the method includes receiving a file that includes provisioning for at least one service, processing the file based at least in part on a plurality of attributes in the file, the each of the plurality of attributes associated with the at least one service, creating a service request based at least in part on the file, the service request comprising a plurality of service data attributes, creating an extensible markup language (XML) string based at least in part on the service request, invoking a provisioning agent programming interface (API), and provisioning a service to fulfill the service assignments.

5 Claims, 6 Drawing Sheets

SYSTEM AND METHOD FOR BULK USER SERVICE ASSIGNMENT USING CSV

TECHNICAL FIELD

This disclosure relates to a system and method of managing user service assignments in a cloud service environment, and more particularly, to a system and method for bulk user service assignments using comma separated values in bulk administration files.

BACKGROUND

Service Providers (SP) may be software broker companies who provide software services from various service vendors (e.g. Microsoft®, Dropbox® etc.) via the internet to customers. SPs may leverage a cloud service environment that is an end-to-end platform with modules for marketplace, storefront, subscription management, service catalog, ticketing, provisioning automation, usage collection, rating, recurring billing, taxation, invoicing, and payments with self-service management portals for users, organizations, and channel partners to monetize and manage any offerings. These offerings include as business applications, cloud services, software as a services (SaaS), data as a service (DaaS), infrastructure as a service (IaaS), and IT as a service (ITaaS). In such embodiments, SPs may enroll multiple users to a single service, or enroll multiple organizations (e.g. companies) with multiple users to such services.

Figure 1A:
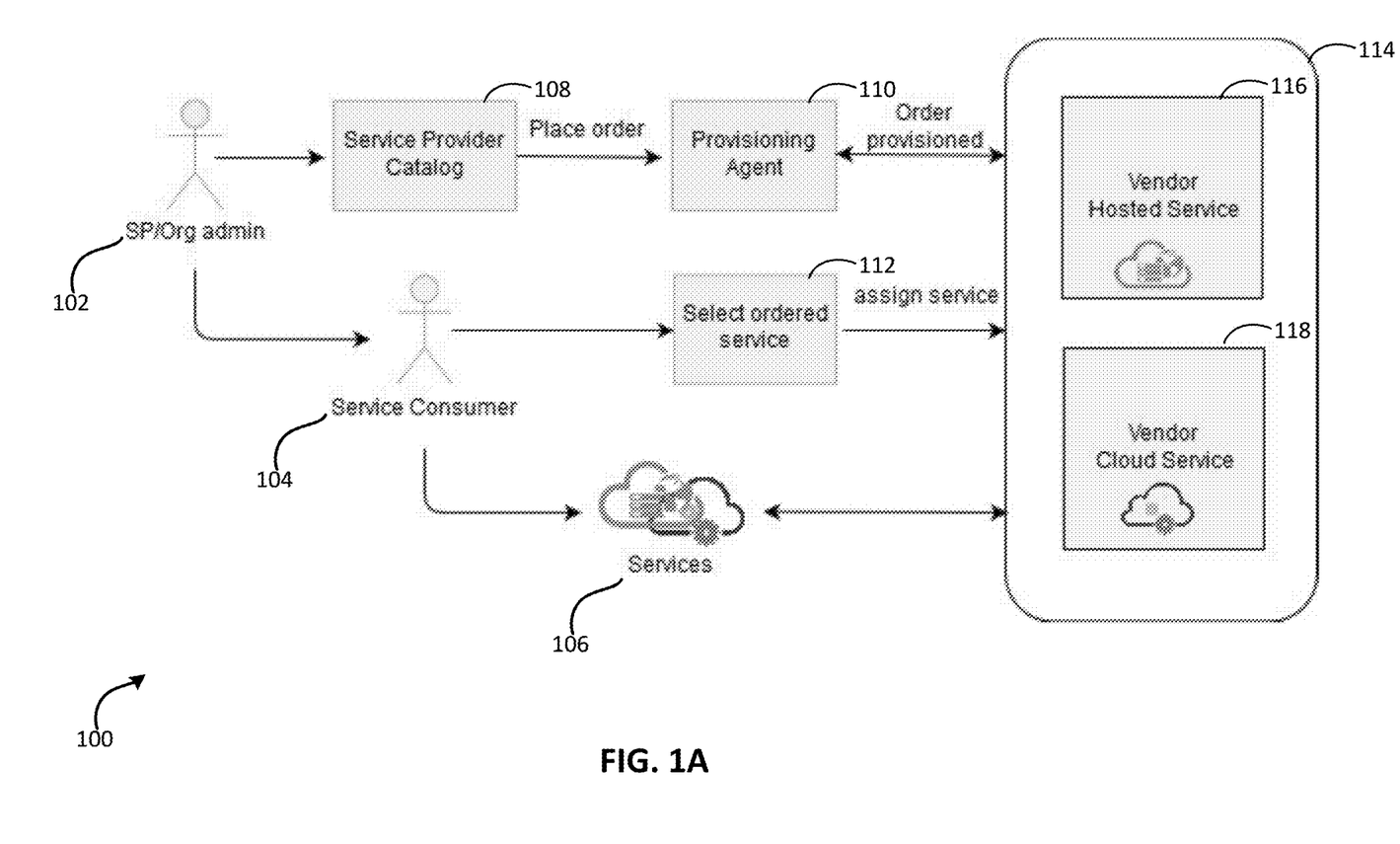
FIG. 1A. is a schematic drawing of a system for managing user service assignments in a cloud service environment, according to at least one embodiment of the present disclosure.

For example, referring to FIG. 1A, it is shown a cloud service environment 100, wherein service provider 102, provisions a plurality of services 106 for a service customer 104. In such an embodiment, the cloud service environment 100 further includes a service provider catalog 108, a provisioning agent 110, a service selector 112, a hosted vendor service 116, and a vendor cloud service 118. In such embodiments, the service provider 102 needs to perform the process of service assignment by picking individual users (e.g. a service customer 104) one by one or in bulk and assigning services to every such user. Alternatively, the service provider 102 can use a service specific control panel to manage the same.

Figure 1B:
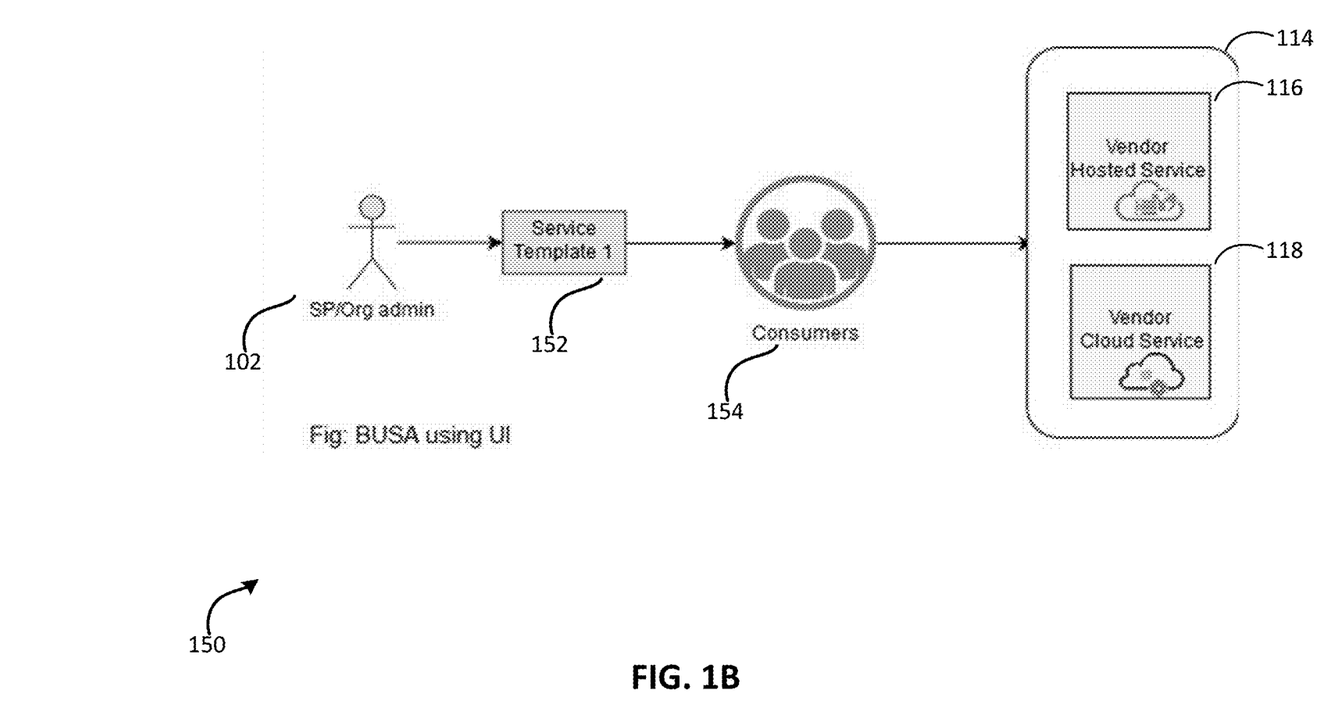
FIG. 1B. is a workflow of a method for managing user service assignments in a cloud service environment, according to at least one embodiment of the present disclosure.

In such embodiments, the process of provisioning, or modifying a user's services has to be performed manually or is technically and operationally limited. For example, referring to FIG. 1B, it is shown another embodiment of the cloud service environment 100 where a service provider 102 requires the use of a service template 152 to provision consumers 154 with various services 114. In such an embodiment, the service template 152 may be a configurable user interface. However, the current method only allows selecting a single service template (i.e. service template 152) and then the appropriate consumers 154. The solution however, has limitations: choosing specific set of users, where there are large sets of users can be tedious and challenging.

Therefore, there is a need for an improved and more efficient system and method of managing user service assignments in a cloud service environment.

SUMMARY

The present disclosure relates to a system for managing user service assignments in a cloud service environment. The system includes a service provider, a plurality of service templates, a plurality of consumers, and services. In at least one embodiment of the present disclosure, the service provider may configure the plurality of service templates which may be assigned to different sets of consumers wherein each of the plurality of service templates holds specific information about the services.

In at least one embodiment of the present disclosure, it is shown a method for managing user service assignments in a cloud service environment. The method includes importing a comma separated values (CSV) file, parsing the CSV file, creating a background thread, fetching records, checking if records are processed, stopping the background thread, finishing, validating a record, creating a service request, converting a service request, creating a service specific Extensible Markup Language (XML) file, invoking a provisioning agent, and assigning services.

In at least one embodiment of the present disclosure, the method includes creating a CSV file, and importing the CSV file. In at least one embodiment of the present disclosure, the method invokes a provisioning agent to process the XML data stream by taking data from the XML and invoking the applicable services, for example, by an application provisioning agent programming interface (API). In at least one embodiment of the present disclosure, the method is configured to store all requests in a queue.

DETAILED DESCRIPTION

Reference will now be made in detail to the preferred embodiments of the present disclosure, examples of which are illustrated in the accompanying drawings. Additional features and advantages of the disclosure will be set forth in the description that follows, and will be apparent from the description, or may be learned by practice of the disclosure. It is to be understood that both the foregoing general description and the following detailed description are exemplary and explanatory and are intended to provide further explanation of the disclosure as claimed.

Figure 2:
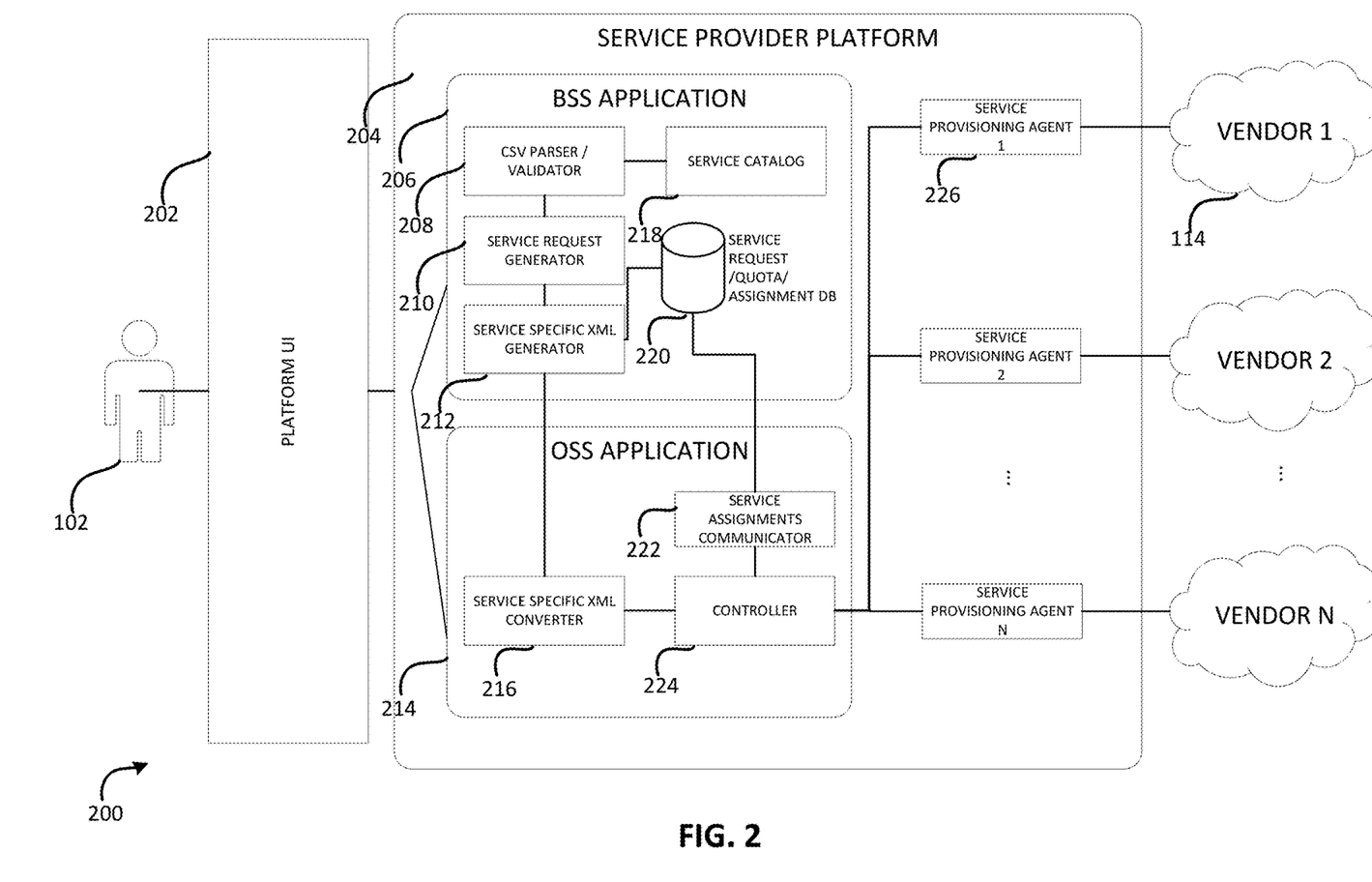
FIG. 2. is a schematic drawing of a system for managing user service assignments in a cloud service environment, according to at least one embodiment of the present disclosure.

Referring now to FIG. 2, it is shown a system for managing user service assignments in a cloud service environment, generally indicated at 200. The system 200 includes a user 102, platform UI 202, a service provider platform 204, a BSS application 206, a CSV parser/validator 208, a service request generator 210, a service specific XML generator 212, an OSS application 214, a service specific XML converter 216, a service catalog 218, a service request/ quota/assignment database 220, a service assignment communicator 222, a controller 224, at least one service provisioning agent 226, and at least one service 114 (of a plurality of possible services (vendors)).

In at least one embodiment of the present disclosure, a service provider platform 204 serves as an aggregator and marketplace for a plurality of services 114 that integrate with the service provider platform 204 via a special integration mechanism of the at least one service provisioning agent 226. It will be appreciated that the service provisioning agent 226 transmits data about control operations over services provided by services 114 and initiated by user 102. In at least one embodiment of the present disclosure, the control operations perform service provisioning and assignment operations to a particular user. By way of examples, such operations include service changes, upgrades and downgrades of a particular service (e.g. from a silver subscription plan to a gold service plan and vice versa), deletion of a subscription service, and the like. In at least one embodiment of the present disclosure, service provisioning agent 226 transmits the information about control operation in a format compliant with the vendor requirements. By way of an example, such a format could be an API call, extensive markup language, and the like. It will be appreciated that a user 102 operates the service provider platform 204 via the platform UI 202, where the user 102 is presented with a variety of available service plans, service template definitions and any other information describing the applicable services, and which are stored in the service catalog 218. In at least one embodiment of the present disclosure, the platform UI 202 also contains sample CSV files for service ordering and manuals for filling them out. It will be appreciated that the user 102 may input the order in the CSV file that may contain service orders for a plurality of users and upload it via the platform UI 202, which platform UI 202 is operably connected with the BSS application 206 and OSS application 214. In at least one embodiment of the present disclosure, a CSV parser/validator 208 is configured to receive the CSV file with the order and process it by parsing and validating the service specific information with the service template definitions stored in the service catalog 218. Where the parsing and validation fails (e.g. there is a mismatch), the CSV parser/validator 208 returns error which is shown to the user in the platform UI 202. In at least one embodiment of the present disclosure, the service request generator 210 receives the validated CSV file, whereby for each row of the CSV, the service request generator 210 generates service request objects and stores the information in the service request/quota/assignment database 220, and in relation to a particular user. In at least one embodiment of the present disclosure, the service specific XML generator 212 processes the service orders converting them into XML strings sorted by vendor. In at least one embodiment of the present disclosure, the OSS application 214 receives XML strings and the service specific XML converter 216 translates the XML into a format readable by service provisioning agents 226. In at least one embodiment of the present disclosure, the controller 224 invokes the needed service provisioning agents 226. It will be appreciated that by doing so, the controller 224, by means of the service assignments communicator 222, checks whether quota for a particular service is met for a user to whom the service is assigned. The service provisioning agent 226 calls the APIs of the applicable vendor (e.g. services 114) for executing control operations. The service request/quota/assignment database 220 stores the results of control operations. After control operation execution, the OSS application 214 passes the result to the service provider platform UI for displaying result to the user 102.

Figure 3:
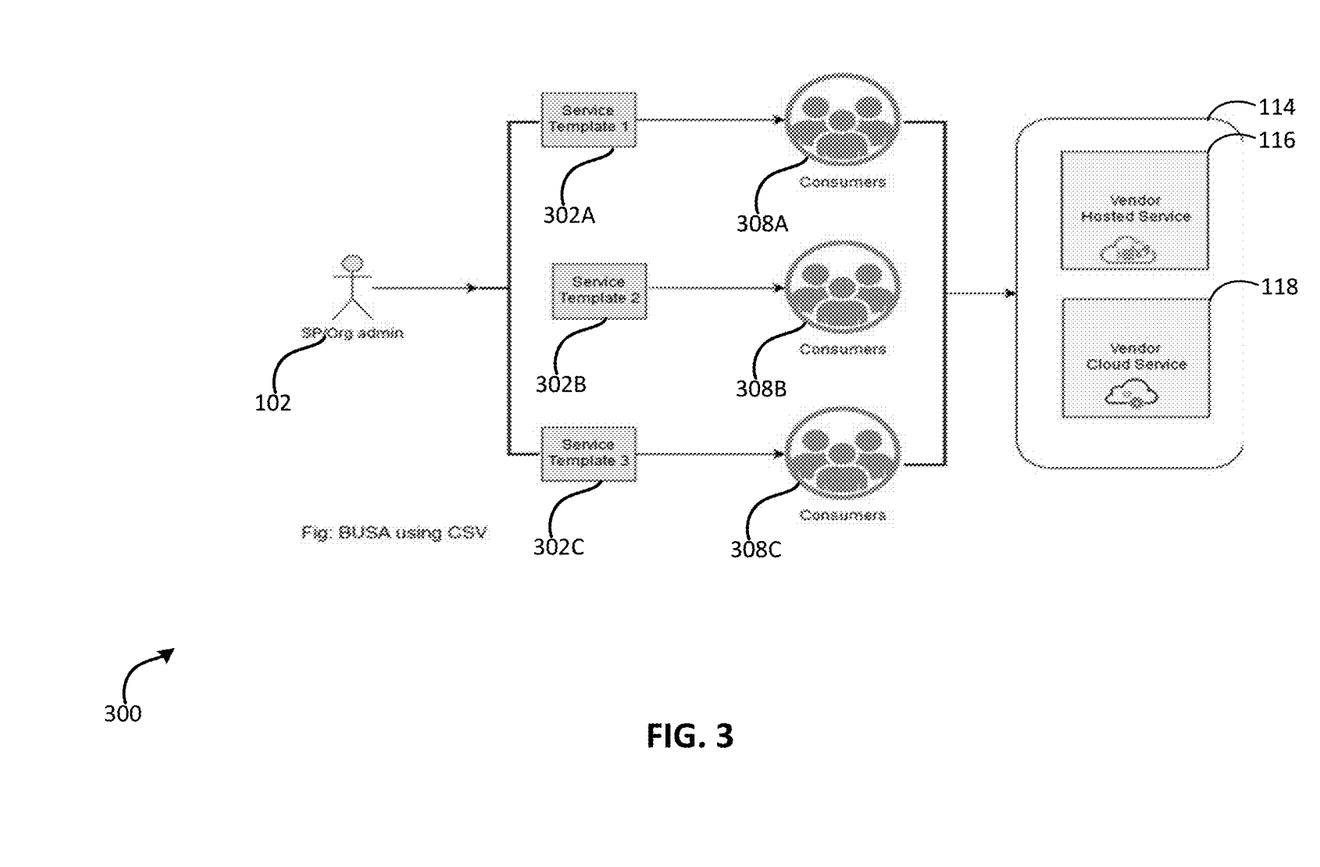
FIG. 3. is a schematic drawing of a system and components for managing user service assignments in a cloud service environment, according to at least one embodiment of the present disclosure.

Referring now to FIG. 3, it is shown a system for managing user service assignments in a cloud service environment, generally indicated at 300. The system 300 includes a service provider 102, a plurality of service templates 302A, 302B, and 302C, a plurality of consumers 308A, 308B, and 308C, and services 114.

In at least one embodiment of the present disclosure, the service provider 102 may configure the plurality of service templates 302A, 302B, and 302C which may be assigned to different sets of consumers (i.e. consumers 308A, 308B, and 308C) wherein each of the plurality of service templates holds specific information about the services 114. It will be appreciated that although only one set of services 114 is shown, it is well within the scope of this invention that the system 300 may include a plurality of services 114. It will be further appreciated specific services may be bundled together to use as a plan, and multiple plans are available in the catalog, whereby the plan(s) is/are termed as a service template and can be used by the end users after placing an order. In at least one embodiment of the present disclosure, the template can be shared into multiple users where the same set of users will have access to those micro features Referring now to FIG. 4, it is shown a method for managing user service assignments in a cloud service environment, generally indicated at 400. The method 400 includes importing a comma separated values (CSV) file at step 402, parsing the CSV file at step 404, creating a background thread at step 406, fetching records at step 408, checking if records are processed at step 410, stopping the background thread at step 412, finishing at 414, validating a record at step 416, creating a service request at step 418, converting a service request at step 420, creating a service specific Extensible Markup Language (XML) file at step 422, invoking a provisioning agent at step 424, and assigning services at step 426.

Figure 4:
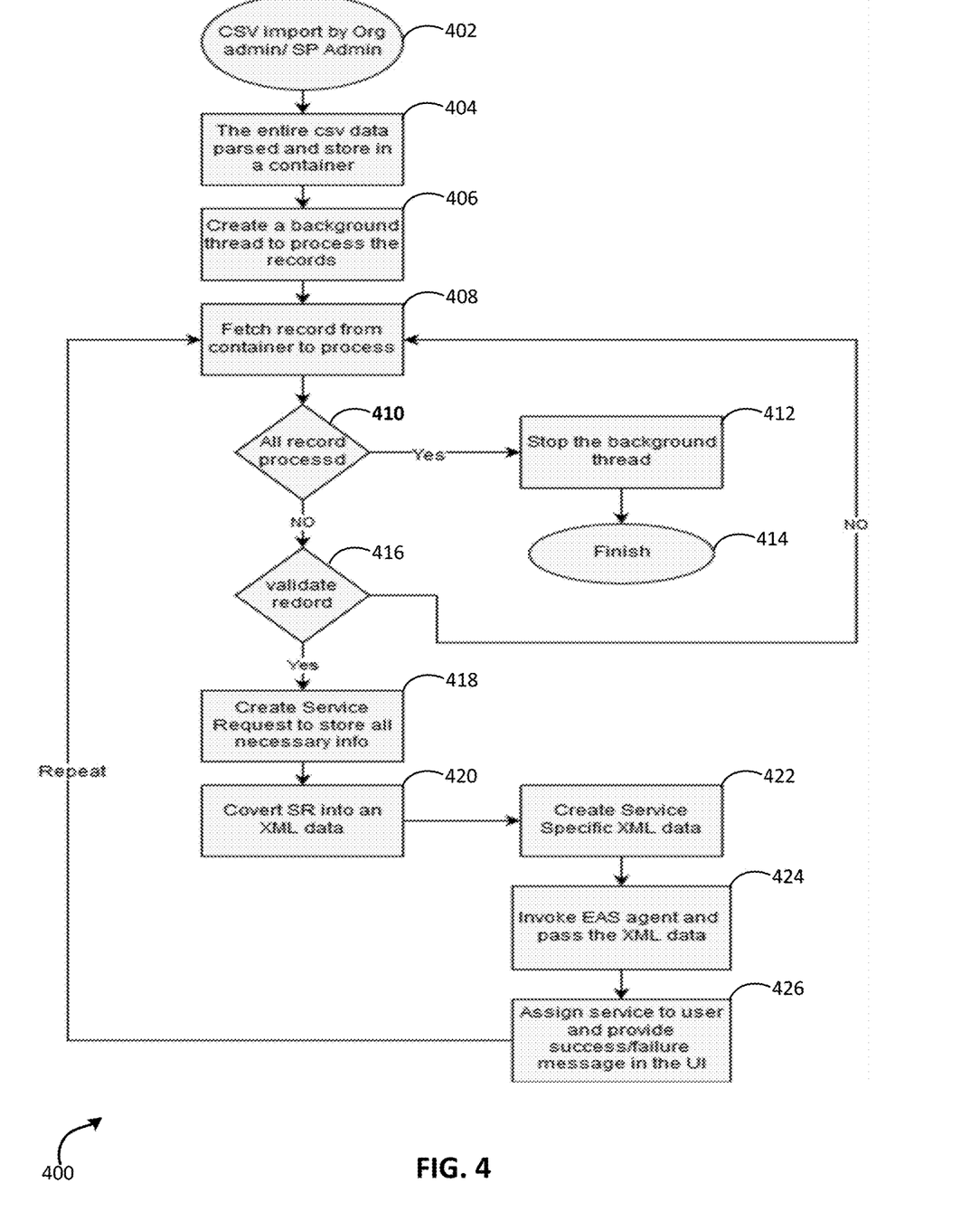
FIG. 4. is a workflow of a method for managing user service assignments in a cloud service environment, according to at least one embodiment of the present disclosure.
Figure 5:
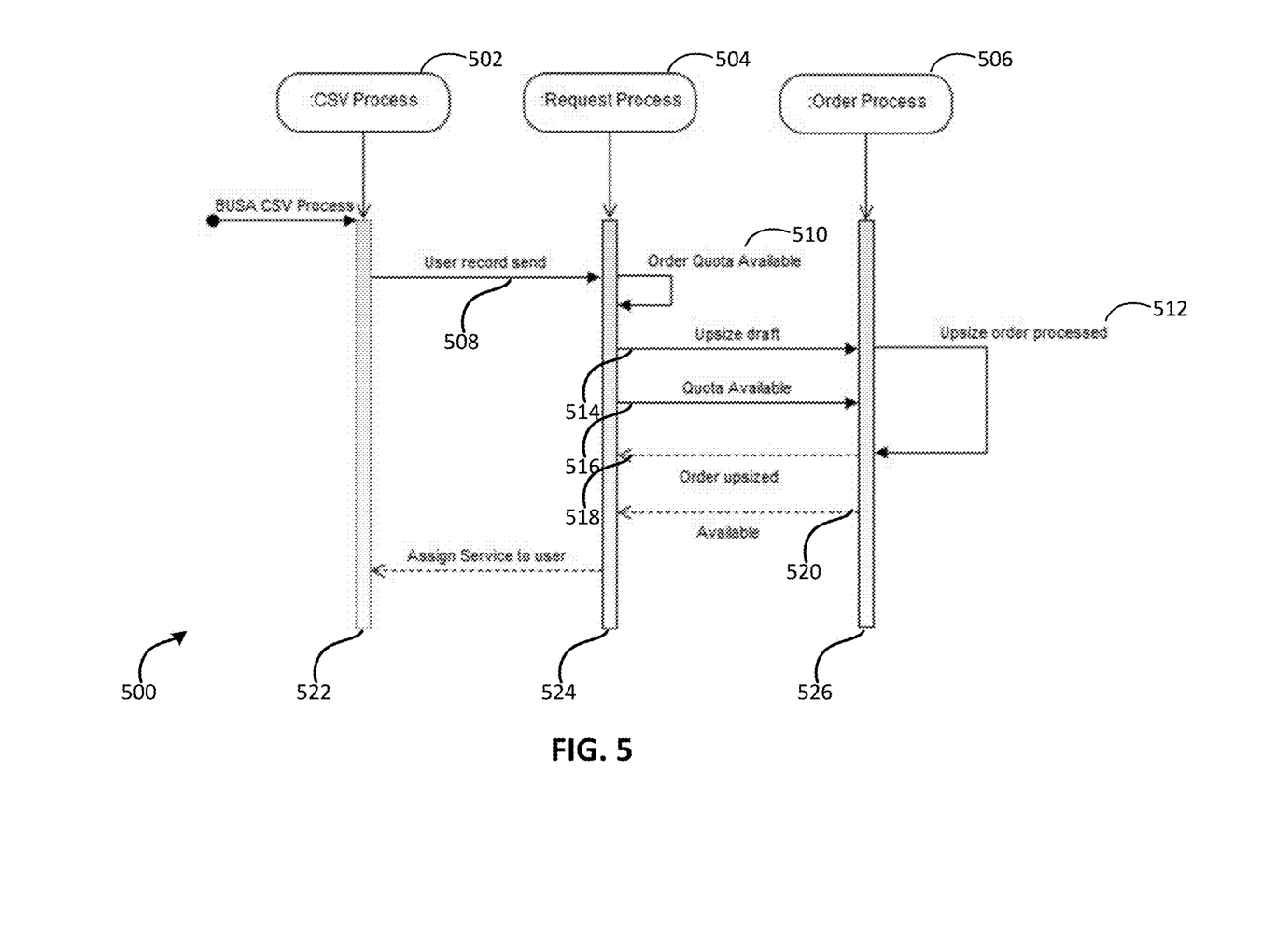
FIG. 5. is a drawing of a workflow and components of a method for upsizing, according to at least one embodiment of the present disclosure.

In at least one embodiment of the present disclosure, the method 400 includes step 402 of creating a CSV file, and importing the CSV file. In at least one embodiment of the present disclosure, the CSV file includes a format that holds a single service template in a single row. By way of an example, a sample CSV file is provided:

|   | A | B | C | D | E | F | G |
|---|---|---|---|---|---|---|---|
| 1 | userName | itemName | Quantity | itemName | Quantity | pif_typeOfMailbox | pif_telephonyOption |
| 2 | John@example.com | Standard Mailbox | 1 | storage | 10 | user | |
| 3 | John@example.com | Enterprise VoIP | 1 | | | | enterprisevoice |
| 4 | Sarah@example.com | Dropbox Plus | 1 | | | | |
| 5 | | | | | | | |

As shown in the example, a first consumer (e.g. consumer 308A) with a username John@example.com will be assigned two different service templates. One service template may contain multiple resources in the field <item-name> and the corresponding quantities in the first row for each of the attributes associated with the service. It will be appreciated that the columns of the CSV file are configurable to be specific to the each of the services, and across various services.

In at least one embodiment of the present disclosure, the CSV can be segregated into 2 sections: 1) Application specific section—consisting of username, itemName and quantity; and 2) Service Specific Section—consisting of all service specific information known as provisioning information (PIFs).

In at least one embodiment of the present disclosure, one row of this CSV holds all assignment information for the user for a single service. By way of an example, if user John@example.com wants standard mailbox and additional storage of a mail service, one row will have two (2) item entries and all the related PIFs as shown in the example CSV; for another service, it will be another row.

In at least one embodiment of the present disclosure, this CSV can be generated by selecting the services from the application portal and downloading a sample file. The sample file will consist of username, item and quantity related columns, as well as all the PIFs applicable to the selected services. These columns will be prefixed with "pif_" for the application to understand that these are service related information, followed by the universal identifier for the PIF. This universal identifier is recognized by the platform, the provisioning agents as well as service vendor systems. By way of an example, a typical column header for a PIF will look like "pif_<PIF_IDENTIFIER>." Continuing with the foregoing example, if the service requires an information for typeOfMailbox, then the column header may be "pif_typeOfMailbox".

Continuing with the above example, if there are three (3) services selected and these three services have twenty (20) PIFs in total, there will be 20 columns in the CSV. It will be appreciated that there will be one column each for item and quantity in the sample CSV; and more columns for the same can be added manually if required.

In at least one embodiment of the present disclosure, a customer (or staff) can populate the CSV file in accordance with applicable standards, and that may be set forth in a guide. It will be appreciated that populating the CSV allows a customer to decide which users to assign which service template as per their business requirements.

In at least one embodiment of the present disclosure, the CSV formats holds a single service template in a single row. By way of an example, username John@example.com may be assigned two different service templates: (a) one service template may contains multiple resources as itemname and its quantities as shown in row 2 of the sample CSV file provided above; or (b) as shown in row 3 of the sample CSV file provided above (for VoIP services). Continued with the sample CSV file provided above, the next row may pertain to the next user in the CSV (i.e. Sarah@example.com), and will be assigned a service template contains a single item as 1 Dropbox® Plus. In at least one embodiment of the present disclosure, the rest information in the csv header prefixed with "pif_" varies across different service templates and may not be applicable to all the services. These are typical service specific attributes which is required to assign services to users.

Continuing with the above example, the mailbox service template assigned with two items as one standard mailbox, with 10 GB storage respectively. In the next row the same user will be assigned another service template called VoIP. For the next user in the CSV Sarah@example.com, will be assigned a service template contains a single item as one Dropbox® Plus. The rest information in the csv header prefixed with "pif" varies across different service templates and may not be applicable to all the services. These are typical service specific attributes which is required to assign services to users.

In at least one embodiment of the present disclosure, the method 400 proceeds to step 404 where the CSV is parsed and stored in a container. It will be appreciated that parsing the CSV file confirms that the CSV is in a valid format and readable. In at least one embodiment of the present disclosure, the method 400 then proceeds to step 406, where a background thread to process the records is created.

In at least one embodiment of the present disclosure, the method 400 checks if all records are processed at step 410. If all records are not processed, the method 400 proceeds to step 416; otherwise, if all the records are processed, the method proceeds to step 412.

In at least one embodiment of the present disclosure, the records in the CSV are validated at step 416, and if valid, the method proceeds to step 418; otherwise, it proceeds to step 408. It will be appreciated that the application specific section is validated against a service order and service catalog stored in the business support system of the service provider platform. The service for the row is also identified at this point. The service specific section is parsed first by isolating the "pif_" columns and then comparing them with the PIF identifiers stored as part of service template definition in the service catalog. Values for the matched PIFs are taken for assignment, rest of them are discarded for this row. It will be appreciated that this process renders the CSV in a service agnostic manner.

In at least one embodiment of the present disclosure, a service request is created at step 418. It will be appreciated that a service request is an object that holds all necessary service related information required to assign a service. In at least one embodiment of the present disclosure, the service request contains a purchase order number, a user name of the consumer (408A, 408B, or 408C), and at least one resource information set, to name a few, non-limiting examples.

In at least one embodiment of the present disclosure, the method 400 proceeds to step 420 where the service object is converted to XML string, and the method 400 creates a service specific XML data, at step 422.

In at least one embodiment of the present disclosure, the method 400 invokes a provisioning agent to process the XML data stream by taking data from the XML and invoking the applicable services, for example, by a provisioning agent programming interface (API). It will be appreciated that there is a service specific XML file which contains various resource IDs, and stored in the location where the platform is deployed. It will be further appreciated that provisioning agents are configured to provision the order as well as assign services to users.

In at least one embodiment of the present disclosure, method 400 is configured to store all requests in a queue. It will be appreciated that this will be asynchronous action and all the request will be processed by a batch job. The job will process each request individually. It will be further appreciated that for each request, a check is performed for availability of order quota. If an order quota/user license gets over, then the backend process will initiate an order upsize request implicitly. Once the order fulfillment is done than the batch job again pick up the pending request to process. By way of an example, if an order quota/license is 50 unit, and a new requests comes in for 70 units, after the first 50 units are successfully assigned, the remaining 20 units are upsizes via the request implicitly. It will be appreciated that the back end is configured to make implicit updates as needed.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for managing user service assignments in a cloud service environment, the method comprising:
    receiving a file comprising provisioning for at least one service;
    processing the file based at least in part on a plurality of attributes in the file, the each of the plurality of attributes associated with the at least one service;
    creating a service request based at least in part on the file, the service request comprising a plurality of service data attributes;
    creating an extensible markup language (XML) string based at least in part on the service request;
    invoking a provisioning agent programming interface (API); and
    provisioning a service to fulfill the service assignments.

2. The method of claim 1, wherein the file comprises comma separated values.

3. The method of claim 1, wherein the plurality of service data attributes comprises a purchase order number, a user name, and a resource information set.

4. The method of claim 1, further comprising the step of receiving a user assignment request, and placing the user assignment request in a queue.

5. The method of claim 4, further comprising the step of initiating an automatic upsize request based at least in part on the user assignment request.

* * * * *